Nov. 6, 1945.  E. A. RING  2,388,574
UTILITY GOGGLE
Filed June 18, 1943  2 Sheets-Sheet 1

Inventor:
Ernest A. Ring
By
Attorneys.

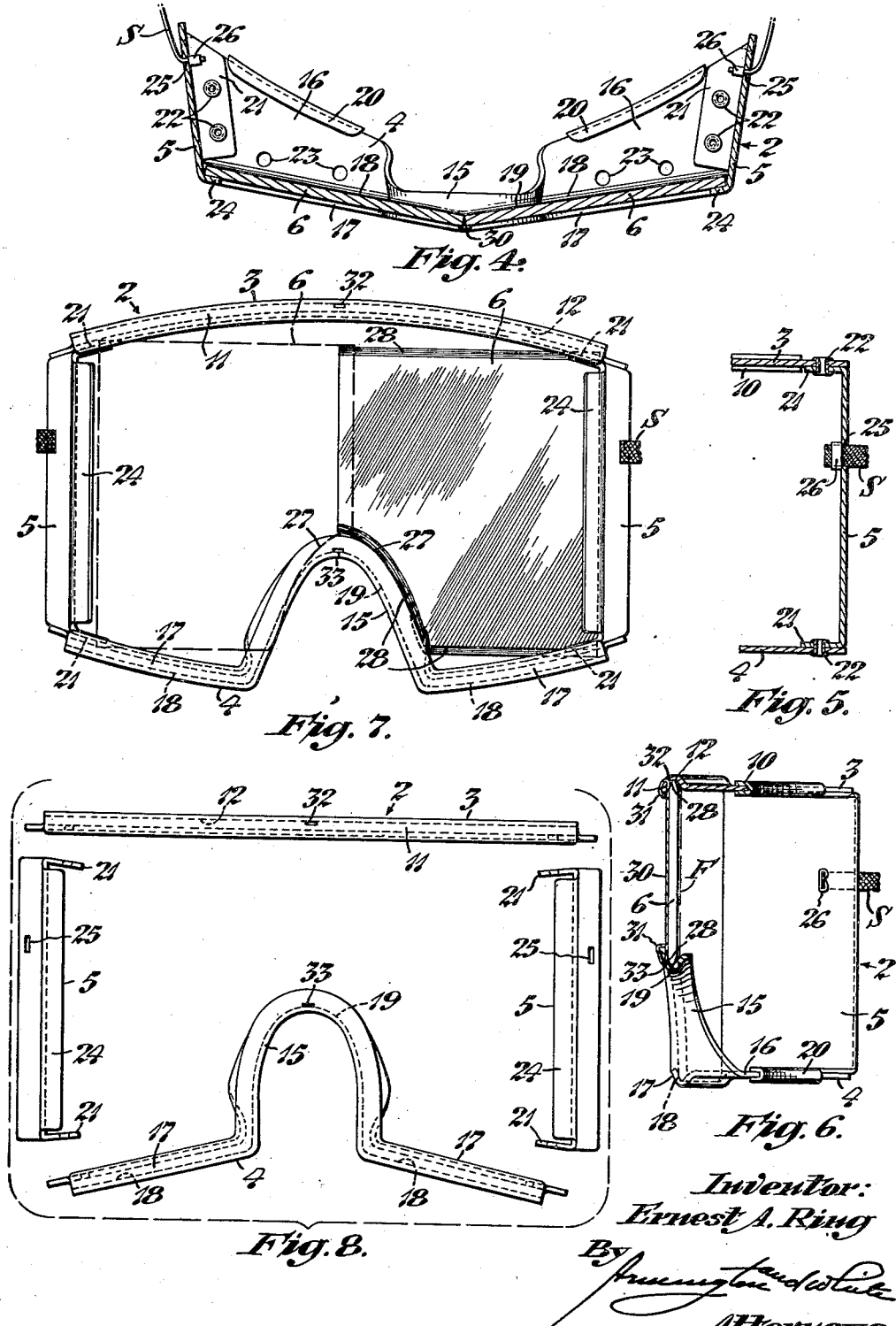

Patented Nov. 6, 1945

2,388,574

UNITED STATES PATENT OFFICE 2,388,574

UTILITY GOGGLE

Ernest Arthur Ring, West Barrington, R. I., assignor of one-half to Francis M. Blakeney, Cranston, R. I.

Application June 18, 1943, Serial No. 491,298

2 Claims. (Cl. 2—14)

This invention relates to goggles for protecting the eyes of the wearer, being particularly adapted for use by workers in industrial plants such as machinists, foundrymen, chippers, welders, stonecutters and other artisans exposed to flying sparks, metal chips or particles thrown from grinding and polishing wheels.

One object of the invention is to provide a sturdy, shock-proof goggle affording maximum protection to the eyes from all angles without obstructing the range of vision in any direction.

Another object is to provide a light-weight, comfortable goggle which will not cause abrasion, irritation or discoloration of the skin of the wearer while also allowing adequate ventilation.

Another object is to provide a goggle which may be worn over prescription glasses without interfering therewith or affecting the optical characteristics thereof.

Another object is to provide a goggle with improved lenses which are free from optical defects, non-glaring, non-fogging, resistant to scratching, and proof against shattering and splintering during continued use under severe exposure to flying particles of metal and abrasives.

Another object is to provide a goggle having a frame constructed from transparent, semi-flexible plastic with its parts capable of being sprung apart to release the lenses for convenient removal and replacement thereof.

Another object is to provide a goggle of the type indicated constructed from plastic material cut or died-out from strip stock, pressed into shape and assembled by inexpensive methods of manufacture.

Further objects of the invention are set forth in the following specification which describes a preferred form of construction of the improved goggle as illustrated by the accompanying drawings. In the drawings:

Fig. 4 is a sectional view of the goggle taken on line 4—4 of Fig. 2;

Fig. 5 is a fragmentary sectional view of one end of the goggle-frame taken on line 5—5 of Fig. 3;

Fig. 6 is a sectional view of the goggle taken on line 6—6 of Fig. 2;

Fig. 7 is a front elevational view of the goggle-frame showing it sprung apart with one of the lenses in position for engagement by the top and bottom members of the frame and indicating in dash-lines the method of removing a lens from the frame; and Fig. 8 is a composite view in front elevation of the several parts of the frame of the goggle.

Figure 1:
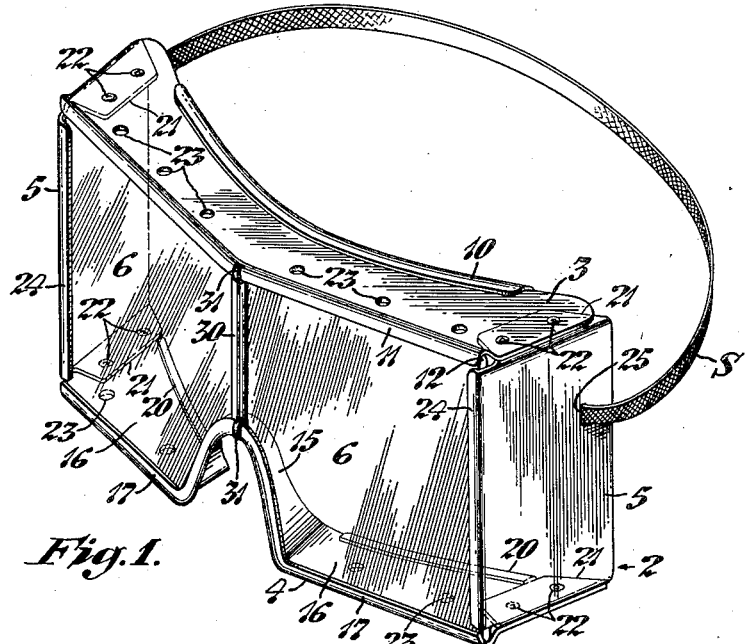
Fig. 1 is a perspective view of a goggle embodying the present invention.

Referring to the drawings, the present goggle comprises a frame 2 constructed in four sections which may have overlapping portions riveted together or, in other cases, it may comprise a lesser number of sections with certain of the panels folded therefrom for connection with the other parts. The frame-sections are constructed from suitable plastic material in sheet form, preferably of transparent cellulose acetate, and arranged to mount a pair of replaceable lenses. The lenses may be of glass, but preferably they are constructed from methyl methacrylate or the material known in the trade as "Plexiglas" which is substantially non-fogging, clear and non-distorting, resistant to scratching and not liable to shatter and splinter under impact by heavy particles of metal.

Figure 3:
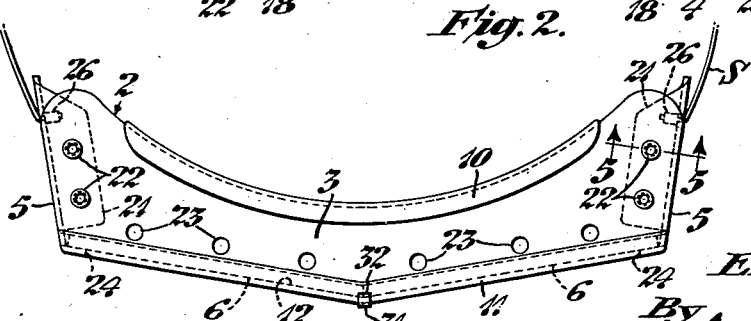
Fig. 3 is a plan view of the goggle.

As herein illustrated, the frame 2 of the goggle is made in four sections comprising a top member 3, bottom member 4, and two opposite end or side panels 5, 5 connected in substantially rectangular box-like form for supporting two separate lenses 6, 6 at the front. The top member 3 is of substantially bow-shape having its rearward edge curved to conform to the forehead of the wearer and its forward edge extending at opposite angles with the apex at the center, see Fig. 3. Preferably, the rearward edge of the top member 3 is enclosed by a narrow channeled strip 10 of the same material bent therearound and cemented thereto to provide a smooth rounded surface adapted to bear against the forehead of the wearer. At the forward edge of the top member 3 the material is bent upwardly and then curved downwardly in a narrow flange 11 to provide a semi-circular groove 12 for receiving the upper edges of the lenses 6.

The bottom member 4 is of substantially the same bowed shape in contour as that of the top member except that its arcuate edge is interrupted at the center by an arched strip 15 forming a bridge or nose-piece connecting the two lateral wings 16 of the bottom member. The arched strip 15 is folded or bent around to provide a smooth circular contour, see Fig. 6, whereof to avoid a rough edge liable to abrade the nose of the wearer. At either side of the nose-piece 15 the wings 16 of the bottom member have flanges 17 bent downwardly and then curved upwardly to provide grooves 18 for receiving the lower edges of the two lenses 6, 6; it being noted also that the nose-piece 15 itself has a similar groove 19. Cemented to the rearward curved edges of the wings 16 of the bottom member 4 are channeled strips 20, similar to the strip 10, to provide a smooth rounded surface for contact with the cheeks of the wearer.

The end or side panels 5 of the frame 2 consist in flat rectangular strips of the material having extensions or tabs 21 bent inwardly at sharp angles to underlie the ends of the top member 3 and bottom member 4. Referring to Fig. 8, these extensions or tabs 21 are preferably bent at an acute angle to the horizontal instead of being perpendicular to the plane of the end panels 5. This provides that when they are fastened to the ends of the top and bottom members 3 and 4 they will exert a tension thereon tending to bow them inwardly toward each other to frictionally grip the edges of the lenses mounted therebetween. This construction also tends to stiffen the structure of the frame and prevent it from twisting or becoming deformed from its substantially rectangular shape. Referring to Fig. 8, it is to be noted also that the bottom member 4 is constructed with its wings disposed at an angle or inclined downwardly from the horizontal so that when it is assembled with the side panels 5 and top member 3 it will exert tension to cause it to engage firmly against the edges of the lenses 6 to prevent them from becoming loose in the frame 2. The side panels 5 may be fastened to the top and bottom members 3 and 4 in any suitable manner as by cementing their tabs thereto but, preferably, the parts are secured together by hollow rivets 22 inserted through the ends of the top and bottom members and through the tabs and headed over on the opposite sides thereof, see Fig. 5. The hollow rivets 22 provide vents at the opposite ends of the frame and preferably a row of punched holes 23 extends along the front of the top member 3 and through the forward portions of the wings 16 of the bottom member 4 to provide further ventilation. At the forward ends of the side panels 5 flanges 24 are bent around from the material to adapt them to overlie the front faces of the lenses 6. The side panels 5 are also provided with narrow slits 25 punched therethrough adjacent their rearward edges for receiving an elastic band or strap S for encircling the head to hold the goggle against the face of the wearer. The elastic band S may have metal clips 26 encircling its terminal portions inserted through the slits 25, the clips being clinched in place on the band to hold it against release from the frame 2.

The lenses 6 are of substantially rectangular outline except for cut-away portions at their inner and lower corners which form curved edges 27 conforming to the arcuate shape of the nose-piece 15 on the frame 2. The upper and lower edges and the curved edge 27 of each lens 6 are preferably tapered or beveled at 28 to adapt them to fit snugly within the curved grooves 12, 18 and 19 of the flanges 11 and 17 on the top and bottom members 3 and 4 and the nose-piece 15 while facilitating their insertion into the frame.

Figure 2:
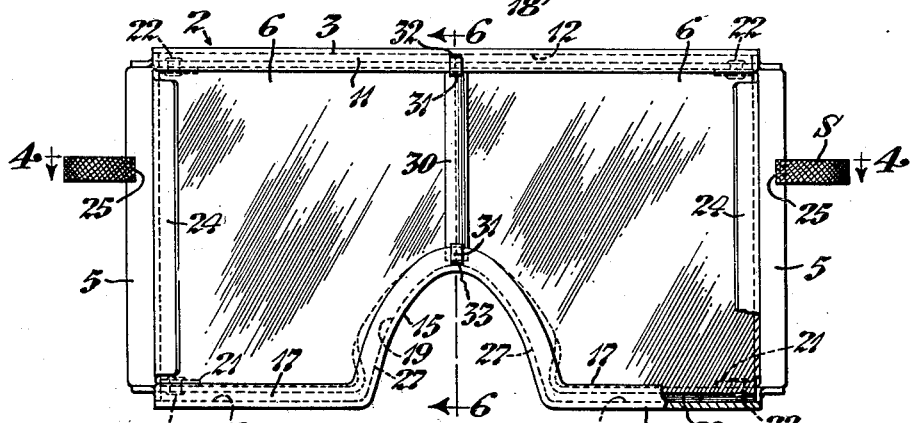
Fig. 2 is a front elevational view of the same.

It has been stated that the frame 2 of the goggles is constructed of plastic material and preferably the material is of such nature as to provide sufficient resiliency to adapt the top and bottom members 3 and 4 to be sprung apart or spread open in the manner illustrated in Fig. 7 of the drawings for inserting the lenses 6 into the frame with their beveled edges 28 engaging the grooves in the flanges 11 and 17. In Fig. 7, one lens 6 is shown by full lines as still held with its outer edges engaging the grooves 12 and 18 in the top and bottom members 3 and 4 and partly engaging the groove 19 in the nose-piece 15. To remove it therefrom the portion of its edge engaged in the groove 19 of the nose-piece 15 is released therefrom and the lens then can be drawn toward the center of the frame as indicated by dash-lines in Fig. 7 to dismount it therefrom. To replace the lenses 6 the top and bottom members 3 and 4 of the frame 2 are sprung apart as shown in Fig. 7 and the two corners at the outer lateral edge of the lens inserted in the grooves 12 and 18 and slid along to the position shown at the right in Fig. 7, whereafter the lower corner of its curved edge 27 may be inserted in the groove 19 of the nose-piece 15 and the frame allowed to contract to its normal shape after both lenses are in position. With the lenses 6 mounted in the frame 2 as shown in Figs. 1 and 2 their shorter lateral edges will abut in a closed seam while their remaining edges are enclosed in and held firmly in the grooves 12, 18 and 19 of the flanges 11, 17 and the nose-piece 15.

In order to further provide for extreme rigidity and sturdiness of the goggle-frame I may attach a metal strut or stay 30 to its top and bottom members 3 and 4 extending therebetween. The stay 30 may consist of a strip of metal slightly bowed or crowned on its forward face to present a finished appearance and positioned with its sides overlying the seam between the two lenses 6, 6. The strut or stay 30 preferably has narrow flexible extensions or tabs 31 at its opposite ends, the upper one of which is inserted through a slit 32 in the flange 11 on the top member 3 and then bent downwardly around its edge as shown in Fig. 6; while the tab 31 on the lower end of the stay is similarly fastened by inserting it through a slit 33 in the flange of the nose-piece 15 and bending it upwardly around its edge as also shown in Fig. 6. The stay 30 may be removed readily for changing the lenses by bending back their tabs 31 with the fingers to release them from the slits 32 and 33.

The goggle may be adapted for use as sunglasses or, in other cases, for shielding the eyes in welding with an acetylene torch, by applying colored filters at the rear of the lenses 6, 6 as indicated by dash-lines at F in Fig. 6. For example, strips of transparent filter material cut to the outline of the lenses may be placed against their rearward faces with their edges inserted in the grooves 12, 18 and 19 in the flanges 11, 17 and the nose-piece 15.

It will be observed from the foregoing specification that my invention provides a light-weight, sturdy and shock-proof goggle particularly adapted to afford maximum protection to the eyes of the wearer. The frame of the goggle constructed from transparent material affords a wide range of vision and the lenses constructed from material known by the trade-name "Plexiglas" are non-fogging and non-distorting while offering maximum resistance to scratching, shattering or splintering under impact. The angular relationship of the lenses at the front of the frame, siimlar to the arrangement of the glass in split windshields of automobiles, has the effect to minimize glare from reflection of light rays.

The frame of the goggle constructed from resilient material provides for spreading its lens-holding elements apart for convenient removal and replacement of the lenses, while at the same time effecting a firm and secure mounting for the lenses to prevent looseness or vibration.

The frame of the goggle being light in weight with its edges of rounded contour for contact with the face renders the goggle more comfortable to wear while still providing maximum protection to the eyes.

The plastic sections of the goggle-frame may be stamped out from sheet-stock and shaped under pressure and heat for economy of manufacture resulting in low cost of the complete article.

While the invention is herein shown as embodied in a goggle having its frame constructed in separate sections connected by riveting, it is to be understood that it may be made with a lesser number of parts joined by other methods, as by cementing, and further modifications may be made in its structure without departing from the spirit or scope of the invention. Therefore, without limiting myself in this respect, I claim:

1. A goggle having a box-like frame comprising a top member, bottom member and side panels of transparent plastic material with the rearward edges thereof shaped to conform to the contour of the face and with the bottom member formed with a nose-opening, a pair of lenses having a marginal contour conforming to the shape of the opening at the front of the frame and mounted therein with their upper and lower edges engaging grooves in the top and bottom members and their inner edges abutting in a seam, and a stay extending between the top and bottom members of the frame overlying the seam between the lenses and detachably connected to the frame.

2. A goggle comprising a frame having a top member of bow-shape with its rearward edge conforming to the contour of the forehead and its forward edge extending in angularly-related planes, a bottom member having its rearward edge conforming to that of the top member and interrupted with an arched nose-piece at the center, said top and bottom members formed with grooves in their forward edges, side panels extending between and connected to the top and bottom members at the ends thereof to maintain said members in spaced apart relationship, a pair of substantially rectangular lenses shaped to fit the opening at the front of the frame with their edges engaging the grooves in the top and bottom members and the nose-piece, said top and bottom members being constructed of resilient material to adapt them to be spread apart to receive the lenses, and a metal stay extending between the top member and the nose-piece overlying the seam between the lenses and detachably connected to the frame.

ERNEST ARTHUR RING.